United States Patent
Queveau et al.

(10) Patent No.: US 7,118,162 B2
(45) Date of Patent: Oct. 10, 2006

(54) FOLDABLE ROOF HAVING A LOCKING SYSTEM FOR A CONVERTIBLE VEHICLE

(75) Inventors: Paul Queveau, Montravers (FR); Gérard Queveau, Le Pin (FR); Jean-Marc Guillez, Cirières (FR)

(73) Assignee: Heuliez, Cerizay Cedex (FR)

( * ) Notice: Subject to any disclaimer, the term of this patent is extended or adjusted under 35 U.S.C. 154(b) by 0 days.

(21) Appl. No.: 10/991,943

(22) Filed: Nov. 18, 2004

(65) Prior Publication Data

US 2005/0264025 A1    Dec. 1, 2005

(30) Foreign Application Priority Data

May 25, 2004    (FR) .................................... 04 05622

(51) Int. Cl.
  *B60J 7/19* (2006.01)
(52) U.S. Cl. ...................... 296/108; 296/121; 296/128; 296/107.17
(58) Field of Classification Search ................ 296/108, 296/121, 128, 107.08, 107.17
  See application file for complete search history.

(56) References Cited

U.S. PATENT DOCUMENTS

| | | | |
|---|---|---|---|
| 6,585,310 B1 | 7/2003 | Guillez et al. | |
| 6,786,529 B1* | 9/2004 | Hasselgruber et al. | 296/108 |
| 6,799,789 B1* | 10/2004 | Guillez et al. | 296/121 |
| 6,832,807 B1* | 12/2004 | Tezuka | 296/128 |
| 6,837,535 B1* | 1/2005 | Plesternings | 296/121 |
| 6,953,217 B1* | 10/2005 | Hasselgruber et al. | 296/121 |
| 2004/0046416 A1 | 3/2004 | Heller et al. | |
| 2005/0242617 A1* | 11/2005 | Guillez et al. | 296/121 |

FOREIGN PATENT DOCUMENTS

| | | |
|---|---|---|
| EP | 0 884 208 | 12/1998 |
| WO | WO02/064391 | 8/2002 |
| WO | WO04/037588 | 5/2004 |

OTHER PUBLICATIONS

Institut National De La Propriete Industrielle French Search Report, Application FR 0405622.

* cited by examiner

*Primary Examiner*—Jason Morrow
(74) *Attorney, Agent, or Firm*—Fish & Richardson P.C.; Richard P. Gilly (57) ABSTRACT

A foldable roof is disclosed, which is adapted to a convertible vehicle, and which includes first and second rigid roof elements connected to one another by a first articulation.

28 Claims, 5 Drawing Sheets

FOLDABLE ROOF HAVING A LOCKING SYSTEM FOR A CONVERTIBLE VEHICLE

CROSS REFERENCE TO RELATED APPLICATION

This application claims priority to French Patent Application No. 0405622, filed May 25, 2004, which is incorporated herein by reference in its entirety.

TECHNICAL FIELD

This invention relates to a roof comprising a plurality of foldable roof elements, for a convertible vehicle; the vehicle itself; the locking system for the roof elements with respect to one another and between at least some of them and the body structure of the vehicle in the open folded position of the roof; as well as the means of reversibly locking the roof in its closed position above the passenger compartment and the open folded position.

BACKGROUND

More specifically, one object of the invention is to simplify and improve the locking and/or the centring or positioning of the roof in both the closed and open (also called stored) positions, in the case of a convertible vehicle, such as a cabriolet for example.

SUMMARY

In this context, an object of the invention is a foldable roof comprising at least a first and a second roof elements that are mobile and suited to cover the passenger compartment of the vehicle in a first, open position, and that may be folded towards one another in a second position, said roof elements having a longitudinal axis and, each a first transversal side and a second transversal side that are longitudinally opposed, said first and second roof elements being connected to one another by at least a first articulation which guides their relative movements, such that in their first, open position, the second transversal side of the first roof element and the first transversal side of the second roof element substantially touch one other, the second roof element comprising moreover at least a second articulation, so that is articulated with respect to the body and the first roof element comprising, towards its first and second transversal sides, respectively first reversible locking means and second reversible locking means, these second reversible locking means being, in the first open position of the roof and in a locked position, inserted into additional locking means positioned towards the first transversal side of the second roof element.

The roof may be pre-assembled independently of the vehicle; the pre-assembled roof contains the complete locking system as well as its controls. It only requires mechanical and electrical connections when assembled to the vehicle.

It may be noted that these characteristics may be advantageously used on the vehicle, as a whole, once the roof has been fitted.

For more effective locking and better reliability in time, it is recommended that, for the first roof element, the first and second reversible locking means are connected to one another, at least on one side of the said longitudinal axis, by means of common actuating means controlled by at least one actuator, also located in this first roof element, such that the movements of the first and second locking means are coordinated.

To lock the roof in the closed position above the passenger compartment, the invention has taken account of connecting and sealing problems, favouring a simple, efficient and reliable solution.

It is also recommended that if the front roof element is the roof element located the furthest forward, at least in the closed position, such that its front edge is substantially in contact with an element of the body structure located close to the windscreen, it is designed so that the first and second reversible locking means can act, both in the closed and opened positions of the roof, by inserting:

in the closed roof position, respectively the said body element located close to the windscreen and the rear roof element, and;

in the opened position of the said roof, the front and rear parts corresponding to the body structure, respectively.

It is even recommended that these first and second reversible locking means preferably act as thrust or traction means, even exerting in these two positions a certain locking force along the longitudinal direction of the first roof element, on the said adjacent additional means.

To complete the above-mentioned roof positioning solution, it is furthermore recommended:

that the front roof element includes moreover first and second support means located respectively towards its front and rear edges, preferably overhanging, seated on additional support means of the body structure or the rear roof element, depending on whether the roof is open or closed, so that this front roof element is on the one hand positioned by the support means and on the other hand locked by the said locking means, and/or that this same roof element comprises first and second centring means respectively located towards its front and rear edges, the said second centring means being, in the closed and locked position of the roof, second reversible locking means inserted with additional centring means located towards the front edge of the rear roof element and the said first and second locking means being, in the opened, folded position of the roof and in the locked state of the first and second reversible locking means, inserted with additional centring means connected to the body structure of the vehicle.

It can be advantageously provided that these support means and these centring means are made as common parts performing both functions.

To simplify the locking operations both when the roof is closed or open and therefore folded, we include the following recommendations:

that in the closed position of the roof and in a locked state, the first centring means and the first reversible locking means of the front roof element be respectively inserted into additional centring means and additional locking means located on a said element of the body structure close to the windscreen, with which the front edge of this front roof element comes substantially into contact in the said closed position of the roof, and that the articulations connected to the front and rear elements of the roof, as well as all of the reversible locking means be adapted and positioned to cooperate equivalently with the front roof element, both in its closed position and its opened position, such that this front roof element be centred and locked identically in both positions.

As concerns the centring, it is furthermore recommended that the additional centring means provided both on the said element of the body structure located close to the windscreen and on the rear roof element on the body structure of the vehicle be identical in that they cooperate equivalently with the said first and second centring means of the front roof element, whether the roof is in the opened or closed position.

Positioning close between the locking and centring means concerned helps precise positioning of the front roof element, in both its opened and closed positions.

Still in the aim of helping precise and reliable positioning and efficient locking, it is further recommended that the reversible locking means have hooks whose open side faces upwards, that are inserted from below the additional locking means and that cooperate with the said centring means and/or the support means which are then positioned above and bear on their additional respective means to hold the front roof element in both upward and downward directions in a locked state. Centring means and/or support means which act as indicated above may be advantageously used to support a pre-assembled roof module during transport. The roof module may also be locked using its own locking system.

In a preferred embodiment, it is further provided that the rear roof element is comprised of several parts.

DESCRIPTION OF THE DRAWINGS

A more detailed description of the invention is provided below, in reference to the appended drawings given by way of example and in which.

DETAILED DESCRIPTION

Figure 1:
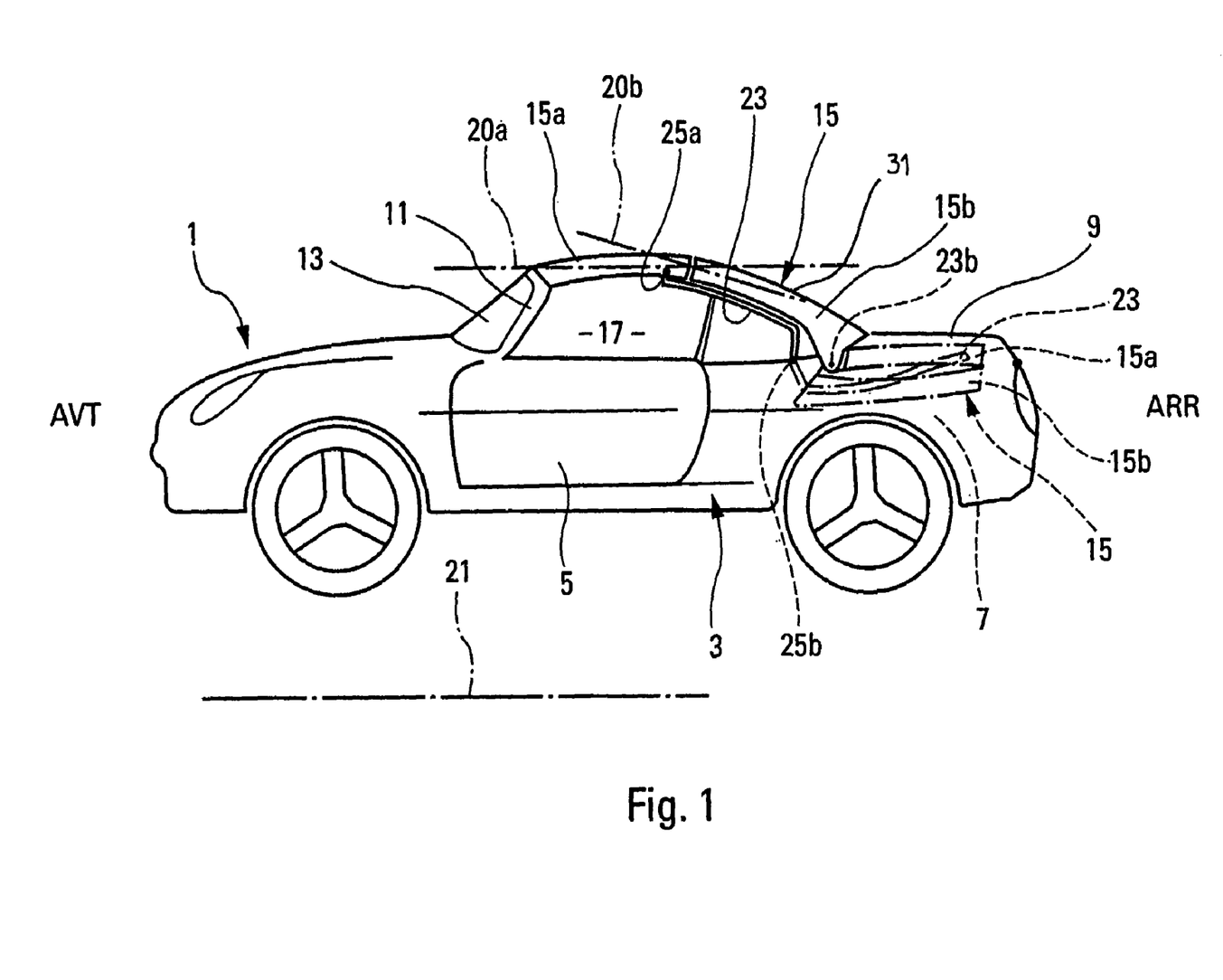
FIG. 1 is a schematic view of a vehicle.

In FIG. 1, we can see a vehicle 1 comprising a body structure, also called the bodywork or structure of the vehicle, which here incorporates doors shown by 5, a boot 7 closed by a pivoting boot lid 9 and a frame 11 limited by a windscreen 13, in particular.

On the body structure, 3, a removable roof 15 is articulated such that the vehicle 1 constitutes a convertible, typically a vehicle that may be transformed into a cabriolet.

Figure 2:
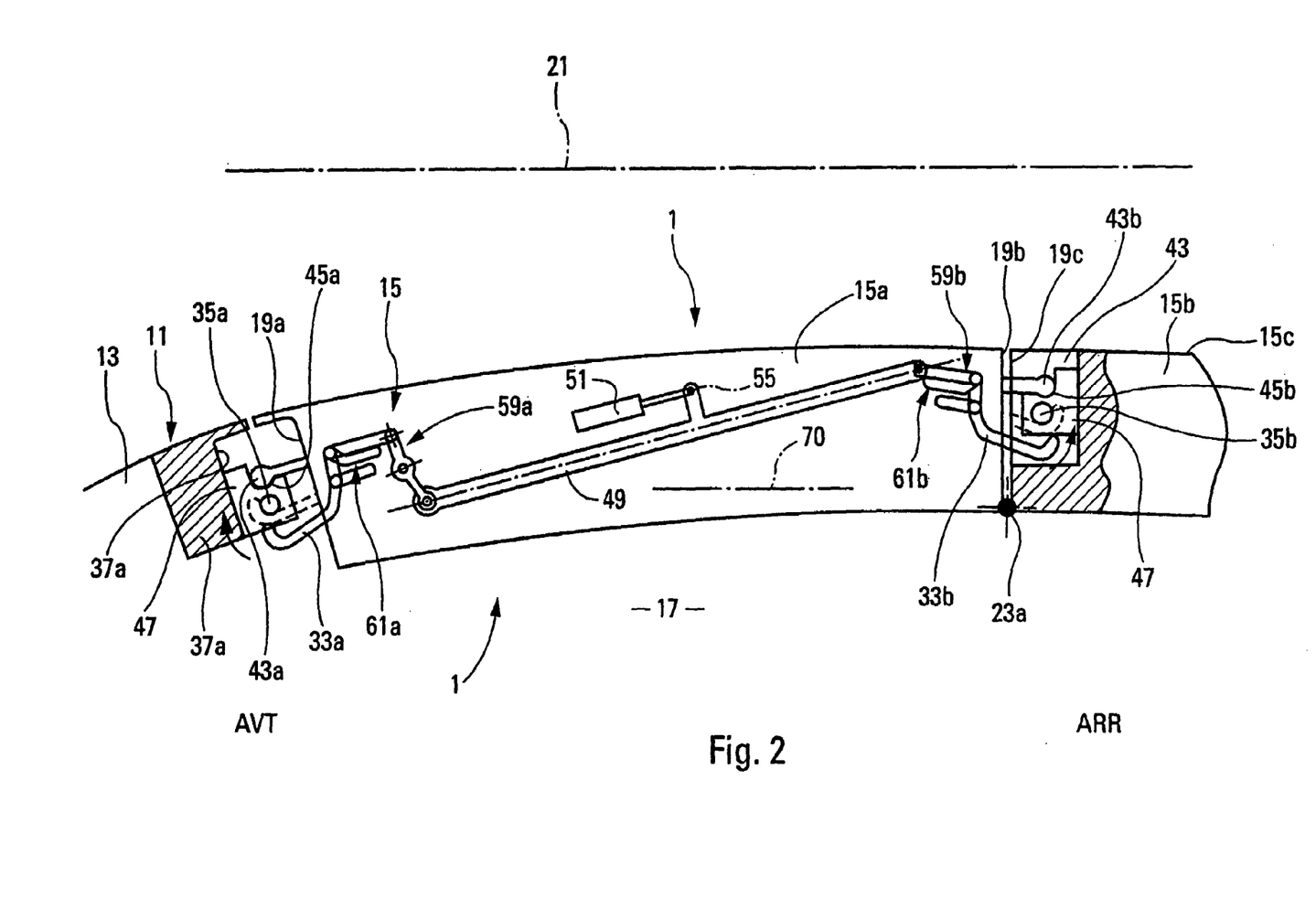
FIG. 2 is a partial schematic view in a longitudinal section along axis 21 of a part of the removable roof, shown in the closed position above the passenger compartment.
Figure 3:
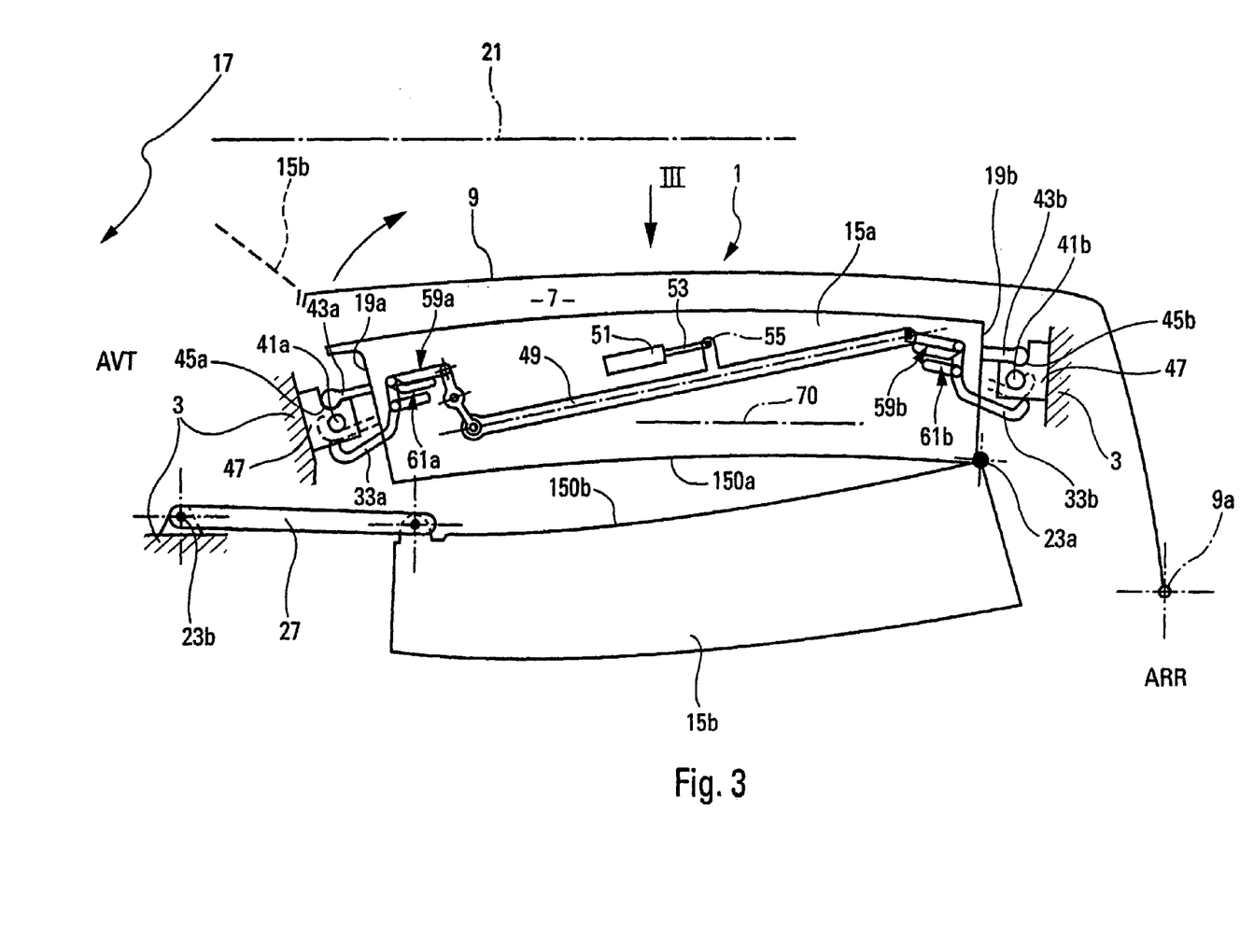
FIG. 3 is also a schematic view along the same longitudinal axis of the vehicle, where the roof is in the opened position, here shown folded in the boot of the vehicle, under the closed boot lid.

The roof 15 moves between a closed position shown in a solid line in FIG. 1, as well as in FIG. 2, and an opened folded position shown in dotted lines in FIG. 1 as well as in FIG. 3.

In the closed position, the roof extends above the passenger compartment 17 of the vehicle which it encloses, at least essentially on its upper part, whilst in the opened position, the roof is here located behind the passenger compartment.

The roof 15 comprises several rigid, mobile roof elements, suited to cover the passenger compartment 17 in their first, relatively extended position (FIG. 2), whilst being capable of being folded in the second opened stored position of the roof (FIG. 3).

In FIGS. 1 to 3, the roof 15 comprises two roof elements 15a, 15b, respectively defining a front roof element and, behind along axis 21, a rear roof element. FIG. 1, the longitudinal axis of element 15a is noted 20a, and that of element 15b is noted 20b.

The front and rear roof elements each have, in the raised closed position of the roof, a front edge 19a and a rear edge 19b which extend transversally, here substantially perpendicularly, to the longitudinal axis 21 of the vehicle movement, when the front roof element 15a is therefore above the passenger compartment, here shown more or less in the horizontal position.

The front 15a and rear 15b roof elements are moreover connected to one another by at least a first articulation shown schematically by 23a in FIGS. 2 and 3.

FIG. 1, an arm 23 articulated on the rear of element 1, around a transversal axis 25a, furthermore drives this element between its opened and closed positions. The arm (each lateral arm) 23 is articulated moreover at its other end 25b, with respect to the body 3.

Furthermore, the rear roof element 15b is itself articulated with respect to the body structure 3 by means of at least a second articulation noted 23b in FIGS. 1 and 3, positioned on the end of a bracket or connector arm 27 such that this articulation that is transversal to the axis 21, permits the rear roof element 15b to pivot with respect to the body structure 3 between the opened and closed positions of the roof.

More details concerning the roof kinematics may be found in FR-A-2 805 218 (pages 3 to 5).

In FIG. 3, it can be seen that in the folded position of the front and rear roof elements, the front roof element 15a remains above the rear element 15b, the two elements being positioned more or less horizontally, the front element 15a being in position, whilst the rear element 15b is turned over having pivoted through approximately 180° around the front pivot (23a or 23b), the two roof elements 15a, 15b thus presenting their concave sides 150a, 150b, face to face (FIG. 3).

To move between its opened and closed positions, the roof has a space freed when the lid 9 shown here pivoting at the rear of the vehicle (ARR, FIG. 3) around an axis 9a that is transversal to the longitudinal axis 21, the arrow of FIG. 3 showing the opening of the lid 9.

Thus in the opened position, the roof elements 15a, 15b are shown here housed inside the rear boot 7 covered by the lid 9, behind the passenger compartment and extending towards the front (AVT) and top to move to the closed position as shown in FIG. 1, typically controlled by at least one actuator (not shown).

In FIG. 2, it can be seen that in the closed position, the rear edge 19b of the front roof element 15 and the front edge 19c of the rear roof element 15b are substantially in contact with one another to ensure the continuity and the seal.

In the embodiment of FIG. 1, the rear roof element 15b incorporates the central rear shelf 31 and thus defines a pivoting frame. In this figure, the connecting rod 27 has been shown as bent.

Overhanging at its front and rear edges, 19a, 19b, the front roof element 15a respectively comprises first and second mobile locking means 33a, 33b.

For the efficiency of the locking operations (or even centring operations), it is strongly recommended that the locking and/or centring is carried out towards the front and rear edges of the roof element 15a.

In the closed roof position as shown in FIG. 2, the first and second reversible locking means 33a, 33b, shown in short dotted lines in the locked position, are inserted into additional locking means, respectively front and rear 35a, 35b, respectively positioned towards the rear edge 37a of the upper transversal beam 37 of the windscreen bay which is part of the surrounding structure 11 and towards the front edge 19c of the rear roof element 15b.

In the preferred embodiment shown, the mobile locking means 33a, 33b, located on the roof element 15a each consist of a hook which is inserted into a striking plate that is part of a roll bar 35a or 35b for example solidly attached the upper transversal beam 37, or another element of the body close to the windscreen, or to the roof element 15b, especially at the position of a recess 39 which opens onto the front edge 19c and the top face 15c of the element 15b.

In this way, the locking is performed by the moving parts 33a, 33b, and unlocking in the opposite direction.

In the opened position of FIG. 3, the same front and rear locking means 33a, 33b, can be found connected to the front roof element 15a into which are also inserted additional fixed locking means, 41a, 41b, located respectively opposite the front and rear edges 19a, 19b and thus connected to parts of the body structure 3 of the vehicle.

As the additional locking means 35a, 35b, the additional locking means 41a, 41b, extend transversally, in this case perpendicularly, to the longitudinal axis 20a of the roof element 15a and therefore in this case substantially perpendicularly to the general direction in which the hooks are opened.

In a version considered as favourable in terms of cost, performance and maintenance, all of the additional locking means, both in the closed and opened positions of the roof elements (thus 35a, 35b; 41a, 41b) will be identical. Moreover, they will be located in a relative position such that the movements of the front and rear roof elements 15a, 15b, guided by the above-mentioned articulations will bring the front roof element 15a and consequently its mobile locking means, front and rear 33a, 33b, more or less to the same position as the initial position, which here is more or less horizontal, offset in height and axially more or less towards the front or rear of the vehicle, along the longitudinal axis 21.

Angled positions with respect to the horizontal axis, or even vertical, are obviously possible for the folded roof thanks to adequate positioning of the additional locking means.

For its positioning with respect to the parts surrounding it, the front roof element 15a comprises moreover support and/or centring means, which here are the same, identified as 43a and 43b, on FIGS. 2 and 3.

Advantageously, these means will define suspension means for the front roof element, at least in the opened, folded position, as shown in FIG. 3.

The support means 43a, 43b, are respectively situated towards the front and rear edges 19a, 19b which they overhang along the longitudinal axis 20a. They are preferably fixed parts with respect to the roof element 15a.

The support means 43a, 43b bear on additional support elements of the body structure (FIG. 3, or at the front in FIG. 2) or the rear roof element 15b (at the rear in FIG. 2).

In FIGS. 2 and 3, it can be seen that the additional support elements 45a, 45b, on which the support means 43a, 43b bear and are positioned, are part of units globally noted 47 which themselves are part of or solidly attached to the body 3 (FIG. 3) either at the transversal beam of the bay 37a or at the rear roof element 15b in FIG. 2.

In preference, both the support means 43a, 43b and the additional locking means 41a, 41b will be integrated or attached to the respective parts 47 connected to the body 3 or to the roof element 15b, depending on the case.

In the position of at least certain of these units 47, in preference each unit, the additional support means 45a or 45b is located above the level of the corresponding additional locking means (43a or 43b). It may be in its vertical axis. In any case, they are close to one another and preferably positioned parallel to the longitudinal axis of the element 15a for efficient positioning and locking of the element 15.

The support elements 43a, 43b, comprise, preferably all, therefore both at the rear and the front, projecting pins with round ends or ball joints at their ends which are located in a support cradle corresponding to the surfaces 45a, 45b, which may also be rounded.

Each one of these support cradles will thus house the said support pins at the position of the upper surface of the corresponding part (element 15b or body 3); (FIGS. 2 and 3).

Thus, the element 15a is fitted, longitudinally at the front (AVT) and at the rear (ARR), both in the opened position (FIG. 3) and the closed position (FIG. 2).

To facilitate movement, it is the upper side of the hooks 33a, 33b which are open and they are thus not obstructed by the support pins 43a, 43b. Moreover, in this way, the front roof element is locked upwards by means of the hooks as well as downwards, longitudinally and laterally by means of the support pins.

In the above description, it can be seen that the additional support means (43a, 43b, 45a, 45b) may be considered as longitudinal centring means (axis 20a) for the roof element 15a and more generally for the roof in the closed position (element 15a and 15b with respect to one another) and for the roof with respect to the body structure (opened position, FIG. 3).

When locking, in order to attach the roof element 15a solidly, and thus the roof as a whole, either in the closed or opened position, the locking will preferably generate a certain longitudinal tension on the element 15a, more or less along the axis 21, under a traction or thrust force, depending on the part in question.

In this case, this concerns an axial traction force exerted longitudinally on the element 15a due to the form of the hooks 33a, 33b and the additional means 43a, 43b, behind which the hooks act.

Advantageously, the mobile longitudinal locking means 33a, 33b, are controlled by common means 49 located inside the roof element 15a and controlled by an actuator 51 carried by the element 15a, which here is an electric motor or an electric-hydraulic power source.

In FIGS. 2 and 3, the output shaft 53 of the actuator 51 moves around a transversal articulation axis 55 a bracket connected to a longitudinal rod 49 which controls the front and rear locking means 33a, 33b, here by means of the corresponding articulation levers 59a, 59b, guides by slides 61a, 61b via nipples or pins.

The front and rear are preferably locked and unlocked together, a mark of efficiency and reliability.

Figure 4:
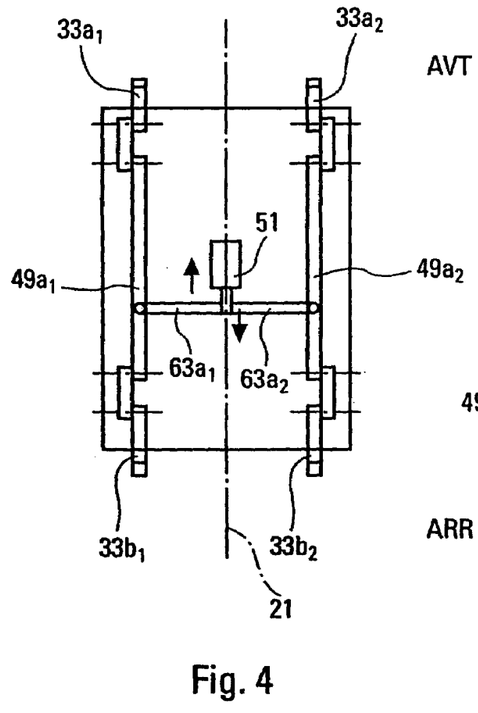
FIGS. 4 and 5 are two schematic views from above along arrow III of FIG. 3 of the front roof element essentially showing its locking means control mechanism.

In the schematic view from above of FIG. 4, the four axial lock pins, front 33a1, 33a2 (identical to 33a), and rear 33a3, 33a4 (identical to 33b) are controlled together, on either side of the longitudinal axis 21, by the electronic actuator 51 via the lateral arms 63a1, 63a2 connected to the rods 49a1, 49a2 (identical to 49) which are each linked as shown in FIGS. 2 and 3 to move the locking hooks. It is easy to envisage other types of control devices such as traction/thrust cable devices for example.

Figure 5:
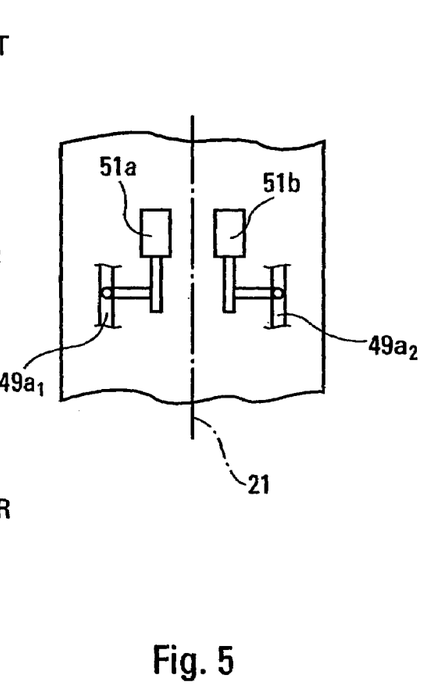

In FIG. 5, the lock pin controls which act axially, respectively on the left and right of the longitudinal axis 21, are separated functionally but have identical constructions.

Two actuators 51a, 51b, act via their output shaft respectively on the axial rods 49a1, 49a2.

The rest of the controls and the locking hooks are identical to those previously presented in relation to FIGS. 2 to 4.

It is possible, in place of the hooks (such as 33a, 33b) to use mobile pins that are more or less axial (preferably parallel to the general plane 70 in which the front roof element 15a extends) to be inserted into or cleared from additional recesses located opposite them in the second roof element 15b (roof closed) or the body structure 3 (FIG. 3 roof opened).

The mobile pins could be also used as axial locking means (axis 20a) and support means for the roof element 15a. However, hooks are preferable as they provide an effective mechanical solution, easy and effective to use to obtain the axial tension mentioned previously and/or the high/low positioning of the element 15a in relation with the support/centring means 43a, 43b.

It may also be noted that the roof element 15a which, on FIGS. 1 to 3, is the roof element the furthest forward of the mobile roof 15, could consist of an intermediate roof element located between a roof element further forward and at least a roof element further behind (at least in the closed state of the roof, above the passenger compartment).

As concerns the rear roof element 15b of FIGS. 1 to 3, it may be made up of several parts.

Figure 6:
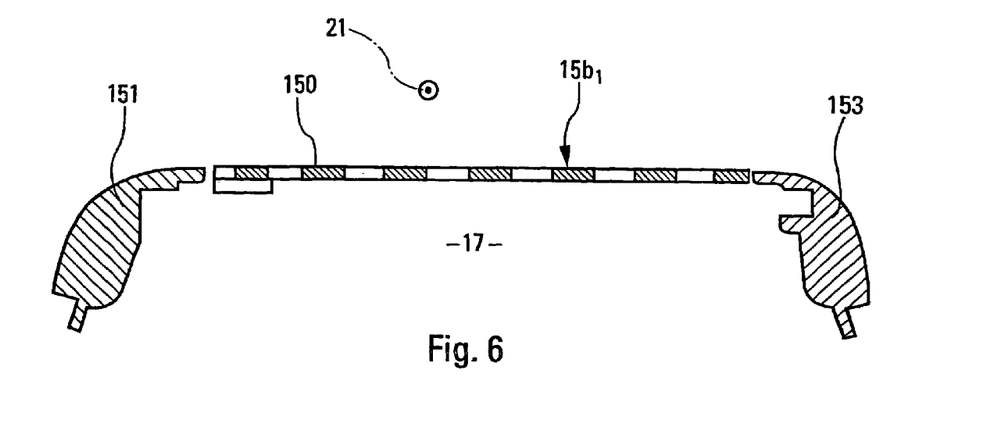
FIG. 6 is a transversal cross section, perpendicular to the longitudinal axis of the vehicle, of an embodiment of the rear roof element, when the latter is made up of several different parts.

In FIG. 6, we can see a variation of this embodiment of the rear roof element in which this rear roof element identified as a unit as 15b1 comprises a central roof element 150 and laterally, on either side of the longitudinal median axis 21, a rear right hand lateral roof element 151 and a rear left hand lateral roof element 153, the section being made vertically and perpendicularly to the longitudinal axis 21

Figure 7:
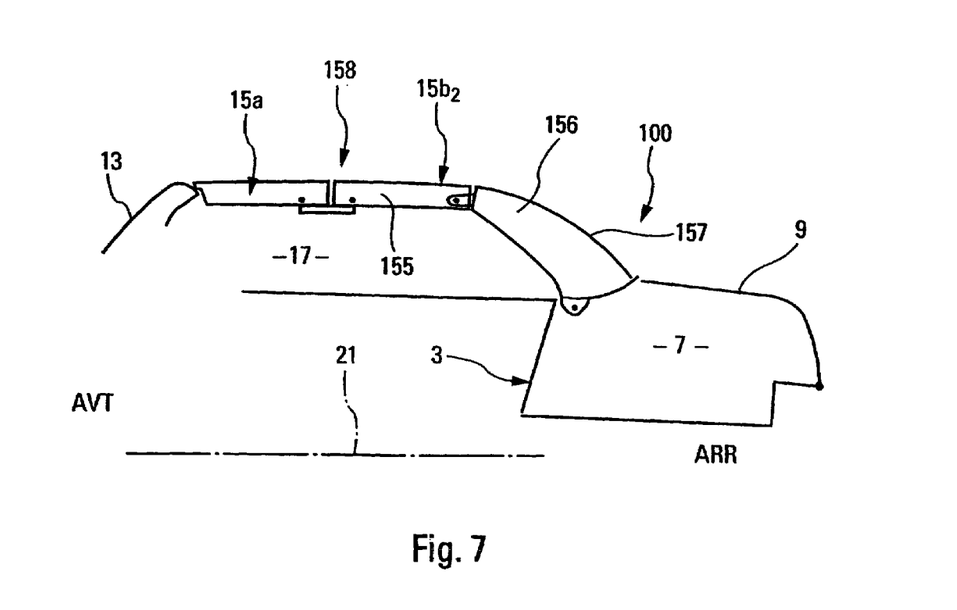
FIG. 7 is a schematic view of a longitudinal cross section of another embodiment of the roof.

It should be noted that the invention also has an application especially if the rear roof element comprises several parts positioned one behind the other with the roof in the closed state as shown in FIG. 7 where the rear roof element 15b2 can be seen to comprise an intermediate roof element 155 and a roof element 156 more to the rear which here defines the frame for the rear windscreen 157, the vehicle as a whole being identified as 100.

In the example of FIG. 7, the front roof element 15a remains the element the furthest forward of the roof 158, which is to say that its front edge comes substantially into contact with the upper transversal bay of the windscreen 13, in the closed state of the roof as shown.

To move the roof from the closed position to lock it open, the procedure is as follows:

the roof elements (such as 15a, 15b) are in a relatively extended position as shown in FIG. 2, with the locking system (33a, 33b; 45a, 45b) locked and the support means/centring means bearing on their additional receiving means 45a, 45b, the front element 15a is released and the various elements of the roof are tilted by articulating them with respect to one another and with respect to the body 3, until the folded position is reached, here shown in FIG. 3;

in the open folded position, the roof articulation means (lever 23a, 27, . . . ) therefore bring the element 15a to rest on the additional means 45a, 45b of the body (FIG. 3), the element 15b itself extends folded next to it. It is held by its articulations 23a, 23b. The hooks 33a, 33b are released.

Guided and positioned in support by its centring devices, 43a, 43b; 45a, 45b, the front element 15a of the roof may then be locked onto the body 3. A coordinated movement of the hooks at the front and the rear locks the element 15a both upwards and downwards (see above) and advantageously places it slightly under tension longitudinally (axis 20a).

In the embodiments described, each hook has an opening facing upwards. The openings may face in any direction, provided that they are facing the centring and/or support means (43a, 43b).

The invention claimed is:

1. A foldable roof for a convertible vehicle comprising a body structure, said roof comprising at least a first roof element and a second roof element adapted to cover a passenger compartment of the vehicle, in a first, extended position, and to be folded back one towards the other to a second folded position in which said passenger compartment is at least partially uncovered, said first and second roof elements having a longitudinal axis and each having a first transversal edge and a second transversal edge that are longitudinally opposed and transverse to said longitudinal axis, the first and second roof elements being connected to one another by a first articulation which guides relative movements therebetween, so that in the first extended position, the second transversal edge of the first roof element and the first transversal edge of the second roof element come substantially into contact, the second roof element further comprising a second articulation for being articulated with respect to the body structure of the vehicle, the first roof element comprising, towards its first and second transversal edges, respectively first reversible locking means and second reversible locking means, wherein:

the first and second reversible locking means both protrude from the respective front and rear edges of the front roof element, and said second protruding reversible locking means are, in the first extended position of the roof and in a locked state, inserted into additional locking means located towards the first transversal edge of the second roof element.

2. The foldable roof of claim 1, wherein both the first and second roof elements are rigid.

3. A foldable roof for a convertible vehicle comprising a body structure, said roof comprising at least a first roof element and a second roof element adapted to cover a passenger compartment of the vehicle, in a first, extended position, and to be folded back one towards the other to a second folded position in which said passenger compartment is at least partially uncovered, said first and second roof elements having a longitudinal axis and each having a first transversal edge and a second transversal edge that are longitudinally opposed and transverse to said longitudinal axis, the first and second roof elements being connected to one another by a first articulation which guides relative movements therebetween, so that in the first extended position, the second transversal edge of the first roof element and the first transversal edge of the second roof element come substantially into contact, the second roof element further comprising a second articulation for being articulated with respect to the body structure of the vehicle, wherein:

the first roof element comprises, towards its first and second tranversal edges, respectively first reversible locking means and second reversible locking means, said second reversible locking means are, in the first extended position of the roof and in a locked state, inserted into additional locking means located towards the first transversal edge of the second roof element, and the first roof element further comprises first and second support means respectively located towards its first and second edges to suspend it both in its first extended position as in its second folded position.

4. The foldable roof of claim 3, wherein, on the first roof element both the first and second reversible locking means are protruding from the respective front and rear edges of the front roof element and are connected to one another, at least on one side of said longitudinal axis by means of common actuating means controlled by at least one actuator located in said first roof element, so that movements of the first and second locking means are coordinated with one another.

5. The foldable roof of claim 4, wherein the actuator comprises one of a single electric motor and a hydroelectric unit.

6. A foldable roof for a convertible vehicle comprising a body structure, said roof comprising at least a first roof element and a second roof element adapted to cover a passenger compartment of the vehicle, in a first, extended position, and to be folded back one towards the other to a second folded position in which said passenger compartment is at least partially uncovered, said first and second roof elements having a longitudinal axis and each having a first transversal edge and a second transversal edge that are longitudinally opposed and transverse to said longitudinal axis, the first and second roof elements being connected to one another by a first articulation which guides relative movements therebetween, so that in the first extended position, the second transversal edge of the first roof element and the first transversal edge of the second roof element come substantially into contact, the second roof element further comprising a second articulation for being articulated with respect to the body structure of the vehicle, wherein the first roof element comprises first and second support means respectively located towards its first and second edges, which both protrude from said first and second transversal edges, respectively, and which are adapted, depending on whether the roof is open or closed, to bear on additional support means provided on the body structure and the second roof element, respectively, to suspend accordingly and directly the first roof element, both in its first extended position as in its second folded position.

7. A convertible vehicle having a longitudinal axis, a front edge and a rear edge, and comprising:
 a passenger compartment,
 a body structure,
 a foldable roof comprising a plurality of roof elements covering the passenger compartment when the roof is in a closed position and adapted to be folded to an opened folded position in which at least part of the passenger compartment is exposed, said plurality of roof elements comprising, in the closed position, a front roof element located in front of a rear roof element, the front and rear roof elements each having, in the closed position of the roof, a front edge and a rear edge and that are linked to one another by at least a first articulation which guides relative movements therebetween, so that in the closed roof position, the rear edge of the front roof element and the front edge of the rear roof element come substantially into contact, the rear roof element being further articulated with respect to the body structure of the vehicle by at least a second articulation, and the front roof element comprising, towards its front and rear edges, respectively first reversible locking means and second reversible locking means, the second reversible locking means being, in the closed roof position and in a locked state, inserted into additional locking means located towards the front edge of the rear roof element and the first and second reversible locking means being, in the opened folded position of the roof and in a locked state, inserted into additional locking means connected to said body structure, the rear roof element being, in this opened folded roof position, held in place by said first and second articulations wherein the front roof element further comprises at least one of the following a) and b) means including:

a) first and second support means located respectively towards its front and rear edges and which bear on additional support means of one of the body structure and the rear roof element, depending on whether the roof is open or closed, so that said front roof element is on the one hand positioned by the support means and on the other hand locked by said locking means, and, b) first and second centring means located respectively towards the front edge and the rear edge of said front roof element, the second centring means being, in the closed roof position and in the locked state of the second reversible locking means, inserted into first additional centring means located towards the front edge of the rear roof element, and the first and second centring means being, in the opened folded roof position and in the locked state of the first and second reversible locking means, inserted into second additional centring means connected to the body structure of the vehicle.

8. The vehicle of claim 7, wherein:
 it further comprises a windscreen,
 the body structure comprises a body element located close to said windscreen,
 the front roof element is the roof element that is located the furthest forward of the roof, at least in the closed position thereof, so that its front edge comes substantially into contact with a part of said body structure located close to the windscreen, and
 the first and second reversible locking means are locked both in the closed and open positions of the roof, by inserting:
 respectively, in the closed roof position, additional means of said part of the body structure located close to the windscreen and said additional means of the rear roof element, and,
 in the opened position of the said roof, the additional means located on corresponding front and rear parts of the body structure, respectively.

9. The vehicle of claim 7, wherein said first support means and first centring means, and said second support means and second centring means are not identical, respectively.

10. The vehicle of claim 7, wherein the first and second locking means are protruding from the respective front and rear edges of the front roof element and are movable with respect to said front roof element and at least some of them are joined together, between the front and rear edges, by a common control mechanism.

11. The vehicle of claim 7, wherein
 the reversible locking means comprise hooks, each having an opening that is engaged with the additional locking means and which cooperate with at least one of the centring means and the support means, which are thus positioned in front of said opening of the hooks and bear onto the additional respective support means, to hold the front roof element in the locked state.

12. The vehicle of claim 7, wherein the rear roof element comprises a plurality of sub-elements comprising lateral roof elements and a central roof element disposed between the lateral roof elements in the closed state of the roof and which separates from said lateral roof elements when the roof moves from its closed position to its open folded position.

13. The vehicle of claim 7, wherein the rear roof element comprises a plurality of sub-elements comprising a series of roof sub-elements which extend one after the other in said longitudinal axis the vehicle movement, in the roof closed position.

14. The vehicle of claim 7, wherein the first and second reversible locking means are locked through a traction operated thereon, so as to exert an axial locking tension on said additional locking means, both in the closed locked position and the open locked position of the roof.

15. The vehicle of claim 7, wherein the first and second reversible locking means are locked like through a thrust operated thereon, so as to exert an axial locking tension on said additional locking means, both in the closed locked position and the opened locked position of the roof.

16. The vehicle of claim 7, wherein:
with the roof in the closed position and in the locked state, the first centring means and the first reversible locking means of the front roof element are respectively inserted into additional centring means and additional locking means located on a part of the body structure close to the windscreen with which the front edge of this roof element comes substantially into contact with, in said closed roof position, and,
the first articulation connecting the front and rear roof elements, as well as all of the reversible locking means are adapted and positioned so as to cooperate with the front roof element, equivalently as in its closed position as in its open position, so that the front roof element is centred and locked identically in both said closed and open positions.

17. A convertible vehicle having a longitudinal axis, a front edge and a rear edge, and comprising:
a passenger compartment,
a body structure,
a foldable roof comprising a plurality of roof elements covering the passenger compartment when the roof is in a closed position and adapted to be folded to an opened folded position in which at least part of the passenger compartment is exposed, said plurality of roof elements comprising, in the closed position, a front roof element located in front of a rear roof element, the front and rear roof elements each having, in the closed position of the roof, a front edge and a rear edge and that are linked to one another by at least a first articulation which guides relative movements therebetween, so that in the closed roof position, the rear edge of the front roof element and the front edge of the rear roof element come substantially into contact, the rear roof element being further articulated with respect to the body structure of the vehicle by at least a second articulation, the front roof element comprising first centring means and second centring means located respectively towards its front edge and its rear edge, the second centring means being, in the closed roof position, inserted into first additional centring means located towards the front edge of the rear roof element, and the first and second centring means being, in the opened folded roof position, inserted into second additional centring means connected to the body structure of the vehicle.

18. The vehicle of claim 17, wherein:
with the roof in the closed position, the first centring means of the front roof element are inserted into the corresponding additional centring means located on a part of the body structure close to a windscreen provided on the vehicle and with which the front edge of said front roof element comes substantially into contact with, in said closed roof position, and,
the first articulation connecting the front and rear roof elements are adapted and positioned so as to cooperate with the front roof element, equivalently as in its closed position as in its open position, so that the front roof element is centred identically in both said closed and open positions.

19. The vehicle of claim 17, wherein the additional centring means provided as on the body structure as on the rear roof element, are identical in that they cooperate equivalently with the first and second centring means of the front roof element, whether the roof is in the open or closed position.

20. The vehicle of claim 17, wherein the first and second centring means of the first roof element are identical.

21. The vehicle of claim 17, wherein the front roof element further comprises, towards its front and rear edges, respectively first reversible locking means and second reversible locking means, the second reversible locking means being, in the closed roof position and in a locked state, inserted into additional locking means located towards the front edge of the rear roof element and the first and second reversible locking means being, in the opened folded position of the roof and in a locked state, inserted into additional locking means connected to said body structure, the rear roof element being, in this opened folded roof position, held in place by said first and second articulations.

22. The vehicle of claim 21, wherein:
with the roof in the closed position and in the locked state, the first centring means and the first reversible locking means of the front roof element are respectively inserted into the additional centring means and additional locking means located on a part of the body structure close to a windscreen provided on the vehicle and with which the front edge of said front roof element comes substantially into contact with, in said closed roof position, and,
the first articulation connecting the front and rear roof elements, as well as all of the reversible locking means are adapted and positioned so as to cooperate with the front roof element, equivalently as in its closed position as in its open position, so that the front roof element is centred and locked identically in both said closed and open positions.

23. The vehicle of claim 21, wherein the first and second centring means are located close to the first and second locking means, respectively.

24. The foldable roof of claim 1, wherein the first and second reversible locking means comprise respective hooks, each having an opening that is engaged with the additional locking means, in a locked state, and which cooperate with at least one of centring means and support means provided on the front roof element.

25. The vehicle of claim 7, wherein said at least one of the first and second support means, and the first and second centring means comprises common pins protruding from the front edge and the rear edge of the front roof element, respectively.

26. The vehicle of claim 17, wherein said first and second centring means are protruding from the front edge and the rear edge of the front roof element, respectively.

27. A convertible vehicle having a longitudinal axis, a front edge and a rear edge, and comprising:
   a passenger compartment,
   a body structure,
   a foldable roof comprising a plurality of roof elements covering the passenger compartment when the roof is in a closed position and adapted to be folded to an opened folded position in which at least part of the passenger compartment is exposed, said plurality of roof elements comprising, in the closed position, a front roof element located in front of a rear roof element, the front and rear roof elements each having, in the closed position of the roof, a front edge and a rear edge and that are linked to one another by at least a first articulation which guides relative movements therebetween, so that in the closed roof position, the rear edge of the front roof element and the front edge of the rear roof element come substantially into contact, the rear roof element being further articulated with respect to the body structure of the vehicle by at least a second articulation, the front roof element comprising first and second support means located respectively towards its front and rear edges, which both protrude from said first and second transversal edges, respectively, and, depending on whether the roof is open or closed, which bear on additional support means provided on the body structure and the rear roof element, respectively, to directly suspend accordingly the first roof element on said additional support means, both in its closed position as in its opened folded position.

28. The vehicle of claim 27, wherein:
   the front roof element further comprises, towards its front and rear edges, respectively first reversible locking means and second reversible locking means, the second reversible locking means being, in the closed roof position and in a locked state, inserted into additional locking means located towards the front edge of the rear roof element and the first and second reversible locking means being, in the opened folded position of the roof and in a locked state, inserted into additional locking means connected to said body structure, the rear roof element being, in this opened folded roof position, held in place by said first and second articulations,
   the reversible locking means comprise hooks, each having an opening that is engaged with the additional locking means and which cooperate with the support means, which are thus positioned in front of said opening of the hooks and bear onto the additional respective support means, to hold the front roof element in the locked state.

* * * * *